UNITED STATES PATENT OFFICE.

C. W. PINKHAM, OF FOND DU LAC, WISCONSIN.

IMPROVED BURNING-FLUID.

Specification forming part of Letters Patent No. 34,772, dated March 25, 1862.

*To all whom it may concern:*

Be it known that I, C. W. PINKHAM, of Fond du Lac, in the county of Fond du Lac, in the State of Wisconsin, have invented or discovered a new kind of fluid or material for burning in fluid-lamps without chimneys, and which I call "Pinkham's Petrol Oil;" and I do hereby declare that the following ingredients constitute the composition of the same—viz., refined petroleum, benzole, naphtha or benzoin, gum-camphor, and essential oil—and that they are used in the following proportions, viz: To twenty-five gallons of benzole, naphtha, or benzoin I add fifteen gallons of refined petroleum or carbon oil, and to this mixture I add one-half pound of any essential oil and one-fourth pound of gum-camphor.

By mixing the ingredients herein named and in the proportions specified a fluid is produced which gives a strong and brilliant light, of a pleasant, agreeable odor, and burns much longer than any known fluid heretofore discovered which is used without a chimney. It is also made for less than twenty cents per gallon, and is therefore one of the most economical of lights.

What I claim as my invention, and desire to secure by Letters Patent, is—

The fluid for illuminating purposes composed of the ingredients substantially in the manner and proportions hereinbefore described and set forth.

C. W. PINKHAM.

Witnesses:
   SUSAN D. PINKHAM,
   C. M. TOMPKINS.